March 7, 1967 J. P. SILVERS ETAL 3,307,827
WAVE POWER CONVERTER
Filed March 23, 1965 2 Sheets-Sheet 1
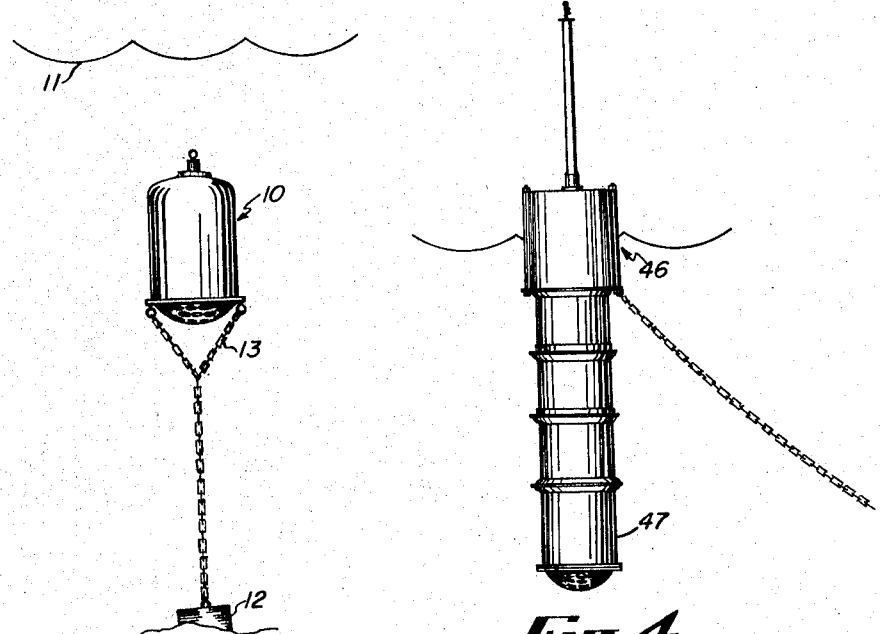
*Fig 1*
*Fig 4*
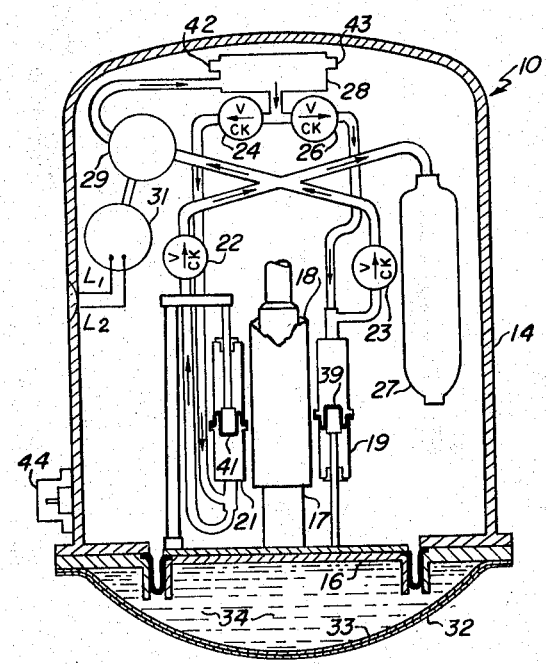
*Fig 2*
JOHN P. SILVERS
RONALD P. DANIS
INVENTORS
BY Alden D. Redfield
ATTORNEYS United States Patent Office 3,307,827
Patented Mar. 7, 1967

3,307,827
WAVE POWER CONVERTER
John P. Silvers, Wilmington, and Ronald P. Danis, Andover, Mass., assignors to Avco Corporation, Cincinnati, Ohio, a corporation of Delaware
Filed Mar. 23, 1965, Ser. No. 442,109
11 Claims. (Cl. 253—4)

This invention relates to ocean wave energy utilization, and more particularly to a device for utilizing the wave energy of a body of water to produce electrical energy.

There exists, at present, a great many applications where remote unattended buoys are utilized in marine operation. These applications may call for overt buoys for research purposes or for covert buoys for military application. In the design of such devices, where the need is for a long-life unattended buoy, a major problem exists in providing a reliable low cost, long-life power supply. The problem is particularly prevalent where the application is for a covert buoy.

Various attempts at wave power conversion have been made in the past to provide such power, but in general have met with little success. These prior attempts at wave conversion have, generally, been directed to utilizing wave surface motion as a source of power supply. The use of surface motion has generally proved disastrous in that the extremely destructive conditions of wind and waves existing on the ocean surface require unusual structural capabilities of the device. The use of surface motion for wave power conversion, therefore, generally results in an unreliable device. In addition, use of surface motion precludes the design of a covert buoy.

The present invention, therefore, has as an object to convert the wave energy on a body of water to electrical energy by utilizing a variation of subsurface pressure.

Another object of the invention is to provide a device for converting wave energy into electrical energy, which device operates completely submerged and without access to the atmosphere.

A further object of the invention is to provide a power supply for use with an unattended buoy, which supply is simple to manufacture, reliable, and suitable for long-time operation.

These objects of the invention, and other objects which will be apparent as the description proceeds, are achieved by providing a housing having contained therein an hydraulic system with fluid flow induced by a linear actuator. The linear actuator is coupled to a piston disposed for movement relative to the housing, in response to changes in subsurface pressure. Fluid flow in the hydraulic system is directed to an hydraulic motor, which in turn is coupled to an electrical generator.

With the housing disposed at any predetermined depth in the body of water, the variations of pressure produced by wave motion on the water surface cause the piston to move, and thereby generate power for direct usage, or the charging of batteries.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is an elevational view showing a taut-moored buoy having the invention employed therein;

FIGURE 2 is a section elevational view of the buoy of FIGURE 1, showing a schematic of a portion of the invention, taken on an enlarged scale for clarity;

Figure 3:
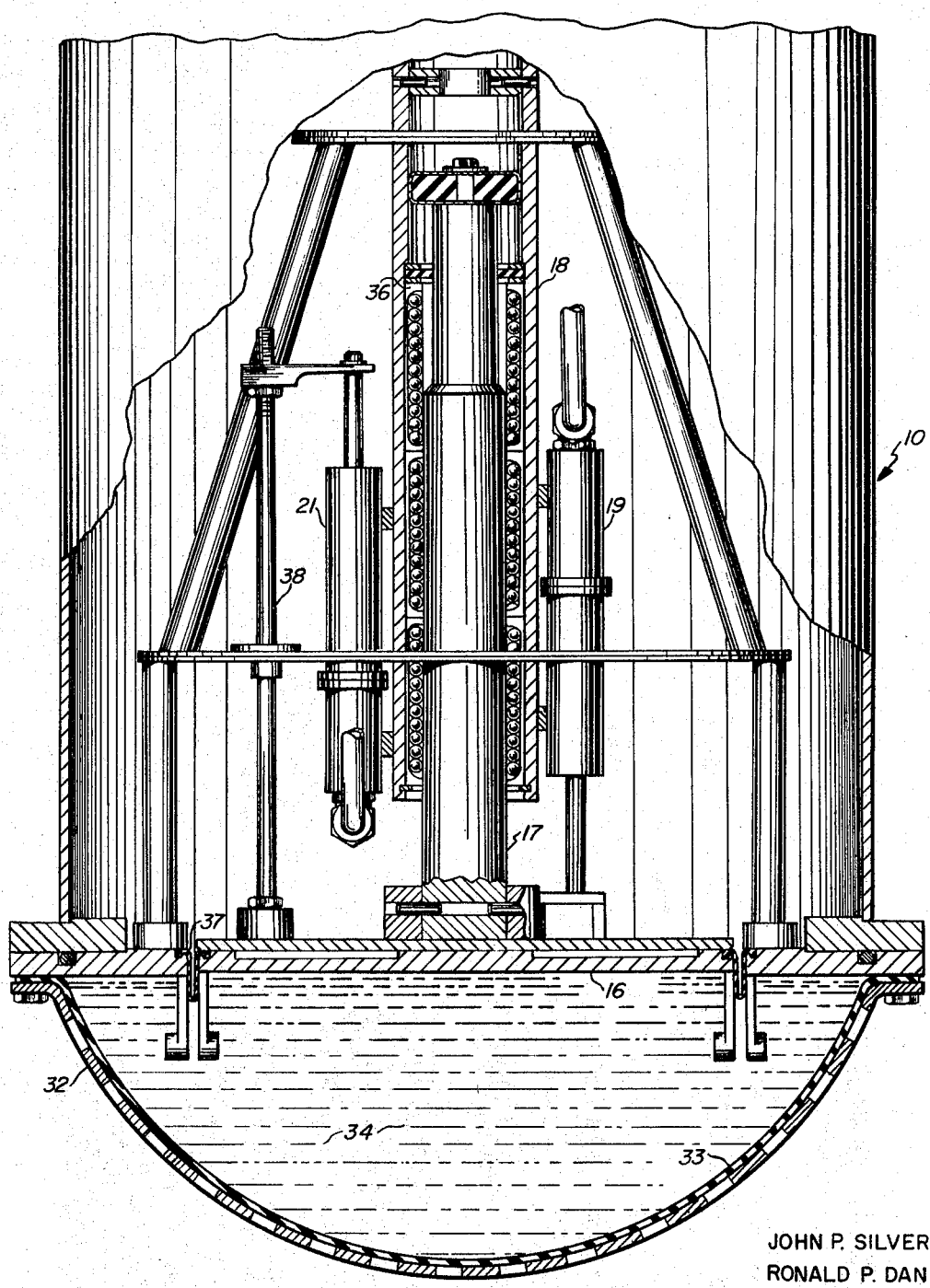
FIGURE 3 is another elevational view of the buoy of FIGURE 1, partially in section, showing portions of the invention in detail and taken on an enlarged scale for clarity; and, FIGURE 4 is an elevational view of a floating buoy having the invention employed therein.

Referring now to the drawings, there is shown in FIGURE 1 a buoy 10, taut-moored at a submerged position below the water surface 11. The buoy 10 is retained below the surface 11 by an anchor 12 connected to the buoy by a mooring chain 13.

In FIGURE 2 it will be noted that the buoy 10 comprises a closed cylindrical housing 14 having a piston 16 disposed in a lower portion of the housing. The piston 16 is connected to a central shaft 17 retained in a sleeve 18, for movement relative to the housing 14.

Referring to the schematic portion of FIGURE 2, there is shown an hydraulic system including a pair of linear actuators 19 and 21 for causing fluid flow in the system. Included also in the system are four hydarulic check valves 22, 23, 24 and 26 permitting fluid flow from the actuators 19 and 21, an accumulator 27, and a reservoir 28 for makeup of hydraulic fluid. Also shown schematically are an hydraulic motor 29 interposed in the hydraulic circuit and receiving power from the fluid flow in the circuit. The hydraulic motor is operatively connected to a generator 31 which distributes electrical energy through the wires L1 and L2.

The various component parts of the hydraulic system are not described nor shown in detail as the items and their function are well known to those familiar with the art, and such details are not deemed necessary to describe the present invention.

Referring now to FIGURES 2 and 3 it should be noted that the outer surface of the piston 16 is covered in its entirety by an open framework 32 having its peripheral edges connected to the housing 14. The framework 32 serves to cover a flexible diaphragm 33 (shown in FIGURE 3) having its edges in sealing engagement between the framework 32 and the housing 10. The volume between the diaphragm 33 and the outer surface of the piston 16 is filled with an incompressible fluid 34 such as a mineral oil.

As will be noted from the following description of the operation of the device, the framework 32, diaphragm 33 and fluid 34 are not basically necessary for operation of the device, however, this combination of elements serve as a secondary seal and provide anti-fouling protection against any hostile environment in which the buoy 10 may be located.

OPERATION

The reader's attention is again called to FIGURES 2 and 3 wherein operation of the invention is shown to take place in the following manner.

With the buoy 10 disposed in a body of water, such as the ocean, the piston 16 is located in a lower portion of housing 14, disposed below the surface of the body of water. The housing is pressurized before installation through valve 44 at a level equal to the average ambient hydrostatic pressure existing at the piston 16 in the implaced depth.

Wave action on the surface of the body of water will produce variations in pressure which are sensed by the piston, being transferred through the diaphragm 33 and oil 34. For example, at the depth of 10 feet, a six-foot wave of seven-second duration produces a pressure cycle of ±1 p.s.i. relative to the ambient pressure. This pressure cycle varies in magnitude with the depth at which the buoy 10 is located, decreasing in intensity with depth. It is, therefore, apparent that only fractional values of p.s.i. result at most of the probable values of wave height and mooring depth practical for such a device. However, as will be seen from the following description, these small pressure fluctuations result in a surprisingly large working force when utilized by the present invention.

Returning again to the drawings, especially FIGURE 3, the central shaft 17 is mounted in a sleeve 18, and contacts the sleeve through a roller sleeve bearing 36. It should also be observed that the piston 16 is connected to the housing 14 through a rolling diaphragm-type seal 37. Both the seal 37 and the bearing 36 are provided to lessen the internal friction of the mechanism, which friction must be kept to a minimum to utilize the small pressures as previously set forth.

The linear actuators 19 and 21 are both of the same type, and are operatively connected to the piston 16. However, while the actuator 19 is directly connected to the piston 16, the actuator 21 is connected through a link member 38. It should, therefore, be apparent that the actuator 19 operates to apply pressure to the hydraulic circuit when the piston 16 is moved inward of the housing 14, while the actuator 21 operates to apply pressure to the circuit when the piston 16 is moved outward of the housing 14.

As is illustrated schematically in FIGURE 2, each of the actuators 19 and 21 are also provided with a diaphragm-type seal for connecting actuator pistons 39 and 41 to the actuators 19 and 21 respectively. Use of seals of this type in the actuators 19 and 21 is, again, to eliminate excessive friction in the circuit and to provide long life.

Referring particularly to FIGURE 2, it should be apparent that a drop in external pressure causes outward movement of the piston 16 and a corresponding movement of actuator pistons 39 and 41 respectively.

By following the arrows shown in FIGURE 2, it will be observed that downward movement of the piston 16 causes a corresponding downward movement of the actuator piston 41. Movement of the piston 41 forces fluid through the check valve 22, through the hydraulic motor 29 and into the reservoir 28. From the reservoir 28, fluid simultaneously flows through the check valve 26 and into the actuator 19 in which a low pressure is established by movement of the piston 39 in the downward direction, caused by movement of the piston 16.

From the foregoing, it should be obvious that upward movement of the piston 16 causes fluid to flow from the actuator 19 through the check valve 23, the hydraulic motor 29, the reservoir 28 and the check valve 24 to the actuator 21.

The unit is, therefore, arranged to be double acting, the actuator 19 pumping on an increase of subsurface pressure, and the actuator 21 pumping on a decrease in subsurface pressure.

It should be noted that hydraulic fluid is constrained to go through the hydraulic motor 29 in one direction only. Therefore, pressure surge produced by the actuators 19 and 21, more rapidly than can be accommodated by the motor 29, is stored in the accumulator 27, and the discharge of fluid from the motor is returned to the system reservoir 28. The reservoir 28 is provided with a pair of relief valves 42 and 43, one opening into the reservoir and the other opening from the reservoir, and each valve is set to open at a very small pressure differential. This arrangement allows free venting of the reservoir 28, but insures a slight amount of positive pressure within the reservoir at all times, thus eliminating the possibility of producing a vacuum in the linear actuators 19 and 21.

As previously described, the means for utilizing the hydraulic energy generated by the movement of the piston 16 comprises the hydraulic motor 29 which operates a generator 31 to produce electrical energy through the lines L1 and L2. The lines L1 and L2 may be directly connected to a battery or other power-utilizing device within the housing 14, or to a pressure fitting 44. The providing of fitting 44 makes it possible to introduce a connector to the lines L1 and L2 to receive power therefrom for use outside the housing 14.

One important consideration of the invention is the providing of a pressure amplification means whereby movement of a pressure sensing means such as piston 16, is translated into electrical energy through the sensing of small differences in pressure, such as are available from subsurface conditions.

In the embodiment shown, the surface area of the piston 16 is 300 square inches, while the surface areas of the pistons 39 and 41 are each one square inch. It is found that a magnification in pressure greater than 100 to 1 is considered adequate to provide usable power from subsurface pressures by employing the embodiment of the invention as shown.

Referring now to FIGURE 4 there is shown an alternate embodiment of the invention wherein a surface buoy 46 is free floating in a body of water having a portion 47 disposed below the surface. The portion 47 is in effect a housing similar to housing 14 having all the components contained in housing 14, disposed therein.

It is found that a power converter is equally effective when attached beneath the surface buoy 46 which is following the surface wave structure, or operating anywhere above a resonant condition for the prevailing sea state. Such a configuration operates internally in a similar manner to that of FIGURE 1, but takes advantage of a pressure effect which might be termed the inverse of that experienced in the submerged, taut-moored buoy 10.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

1. A device for utilizing the wave energy of a body of water which comprises;
   a housing placed in a body of water with a portion of said housing submerged at a predetermined depth below the surface thereof,
   pressure sensing means maintained in said submerged portion of said housing for movement relative to said housing in response to changes in subsurface pressure caused by waves on the water surface, and
   means for utilizing movement of said sensing means.

2. A device for converting the wave energy of a body of water to electrical energy which comprises;
   a housing placed in a body of water with a portion of said housing submerged at a predetermined depth below the surface thereof,
   pressure sensing means maintained in said submerged portion of said housing for movement relative to said housing in response to changes in subsurface pressure caused by waves on the water surface, and
   means for utilizing movement of said sensing means for producing electrical energy.

3. A device for utilizing the wave energy of a body of water which comprises;
   a housing placed in a body of water with a portion of said housing submerged at a predetermined depth below the surface thereof,
   a piston maintained in said submerged portion of said housing for movement relative to said housing, said piston having a surface area exposed to changes in subsurface pressure caused by waves on the water surface, and responsive thereto for producing said movement,
   means for utilizing movement of said piston.

4. A device for utilizing the wave energy of a body of water which comprises;
   a housing placed in a body of water with a portion of said housing submerged at a predetermined depth below the surface thereof, a piston maintained in said submerged portion of said housing for movement relative to said housing, said piston having a surface area positioned for sensing changes in subsurface pressure caused by waves on the water surface, and responsive thereto for producing said movement, a closed hydraulic circuit disposed in said housing, means operatively connecting said piston to said hydraulic circuit for causing fluid flow in said circuit in response to said piston movement, and means for utilizing said fluid flow.

5. A device as described in claim 4 which further comprises;

a diaphragm member sealingly engaged adjacent said housing having its outer surface in contact with the water and enclosing said piston surface area, and a relatively incompressible fluid disposed between said diaphragm and said piston for transferring pressure changes on the outer surface of said diaphragm to said piston surface area.

6. A device for utilizing the wave energy of a body of water which comprises;

a housing placed in a body of water with a portion of said housing submerged at a predetermined depth below the surface thereof, a first piston maintained in said submerged portion of said housing for movement relative to said housing, said first piston having a surface area positioned for sensing changes in subsurface pressure caused by waves on the water surface, and responsive thereto for producing said movement, a closed hydraulic circuit disposed in said housing, said hydraulic circuit having a linear actuator connected therein for causing fluid flow in said circuit, said linear actuator comprising a second piston operatively connected to said first piston, said second piston having a surface area substantially smaller than said first piston area for acting on fluid in said hydraulic circuit, and means for utilizing said fluid flow.

7. A device as described in claim 6 wherein said first piston area and said second piston area are of a ratio greater than 100 to 1.

8. A device as described in claim 6 which further comprises;

a diaphragm member sealingly engaged adjacent said housing having its outer surface in contact with the water and enclosing said piston surface area, and a relatively incompressible fluid disposed between said diaphragm and said piston for transferring pressure changes on the outer surface of said diaphragm to said piston surface area.

9. A device for utilizing the wave energy of a body of water which comprises;

a housing placed in a body of water with a portion of said housing submerged at a predetermined depth below the surface thereof, a piston maintained in said submerged portion of said housing for movement relative to said housing, said piston having a surface area positioned for sensing changes in subsurface pressure caused by waves on the water surface, and responsive thereto for producing said movement, a closed hydraulic circuit disposed in said housing, said hydraulic circuit having a first actuator connected to said piston for causing fluid flow in said circuit in response to movement of said piston in a first direction, a second actuator connected to said piston for causing fluid flow in said circuit in response to movement of said piston in a direction opposite said first direction, and means for utilizing said fluid flow.

10. A device as described in claim 9 which further comprises;

a diaphragm member sealingly engaged adjacent said housing having its outer surface in contact with the water and enclosing said piston surface area, and a relatively incompressible fluid disposed between said diaphragm and said piston for transferring pressure changes on the outer surface of said diaphragm to said piston surface area.

11. A device as described in claim 10 in which said means for utilizing said fluid flow comprises;

an hydraulic motor located in said closed hydraulic circuit and operated by fluid flow therein, and an electric generator operatively connected to said hydraulic motor.

References Cited by the Examiner

UNITED STATES PATENTS

| 1,324,335 | 12/1919 | Bradford et al. | 103—70 |
| 1,766,156 | 6/1930 | Vinson | 103—56 |
| 2,106,264 | 1/1938 | Anastasakis | 103—55 |
| 2,715,366 | 8/1955 | Vartiainen | 103—68 |

FOREIGN PATENTS

| 871,789 | 1/1942 | France. |
| 1,250,609 | 12/1960 | France. |
| 22,658 | 1908 | Great Britain. |
| 172,282 | 12/1934 | Switzerland. |

MARTIN P. SCHWADRON, *Primary Examiner.*

EVERETTE A. POWELL, JR., *Examiner.*